US009430784B1

(12) United States Patent
Frederick et al.

(10) Patent No.: US 9,430,784 B1
(45) Date of Patent: Aug. 30, 2016

(54) SYSTEM FOR E-COMMERCE ACCESSIBILITY

(71) Applicants: David Frederick, Brooklyn, NY (US); Darren Gregory Floyd, New York, NY (US)

(72) Inventors: David Frederick, Brooklyn, NY (US); Darren Gregory Floyd, New York, NY (US)

(*) Notice: Subject to any disclaimer, the term of this patent is extended or adjusted under 35 U.S.C. 154(b) by 441 days.

(21) Appl. No.: 13/853,751

(22) Filed: Mar. 29, 2013

Related U.S. Application Data

(60) Provisional application No. 61/618,481, filed on Mar. 30, 2012.

(51) Int. Cl.
*G06Q 30/06* (2012.01)
*G06Q 30/02* (2012.01)

(52) U.S. Cl.
CPC .................................. *G06Q 30/0277* (2013.01)

(58) Field of Classification Search
CPC ............ G06Q 30/06; G06Q 30/0613; G06Q 30/0641
USPC ................................................ 705/26.1, 27.1
See application file for complete search history.

(56) References Cited

U.S. PATENT DOCUMENTS

| 7,457,778 | B2 | 11/2008 | Li et al. | 705/39 |
|---|---|---|---|---|
| 7,610,218 | B2 | 10/2009 | Bodmer et al. | 705/26 |
| 8,175,928 | B2 | 5/2012 | Klinger et al. | 705/26 |
| 8,200,537 | B2 | 6/2012 | Pike et al. | 705/26 |
| 8,239,533 | B2 | 8/2012 | Leahy et al. | 709/225 |
| 2002/0111907 | A1 | 8/2002 | Ling | 705/41 |
| 2008/0010120 | A1 | 1/2008 | Chung et al. | 705/14 |
| 2008/0183593 | A1* | 7/2008 | Dierks | 705/26 |
| 2008/0189190 | A1 | 8/2008 | Ferber | 705/26 |
| 2008/0208761 | A1 | 8/2008 | Autry et al. | 705/78 |
| 2009/0216633 | A1* | 8/2009 | Whitsett et al. | 705/14 |
| 2010/0106564 | A1 | 4/2010 | Manesh et al. | 705/10 |
| 2010/0106565 | A1 | 4/2010 | Manesh et al. | 705/10 |
| 2010/0114739 | A1 | 5/2010 | Johnston | 705/27 |
| 2010/0257043 | A1 | 10/2010 | Kassaei et al. | 705/14.23 |
| 2010/0299212 | A1 | 11/2010 | Graylin et al. | 705/14.66 |
| 2011/0016021 | A1 | 1/2011 | Manning | 705/26.8 |
| 2011/0099088 | A1 | 4/2011 | Berrios et al. | 705/26.81 |
| 2012/0095881 | A1 | 4/2012 | Rothman | 705/27.2 |
| 2012/0116897 | A1 | 5/2012 | Klinger et al. | 705/14.73 |
| 2012/0123910 | A1 | 5/2012 | George | 705/27.1 |
| 2012/0150666 | A1 | 6/2012 | Savic | 705/14.73 |
| 2012/0203661 | A1 | 8/2012 | Baharloo et al. | 705/26.8 |
| 2012/0290374 | A1* | 11/2012 | Tedjamulia | G06Q 30/0282 705/14.11 |

OTHER PUBLICATIONS

"72Lux White Label Universal Checkout and Shoppable Technology", <<http://www.72lux.com>>, accessed on May 29, 2014.
"What We Do, 8th Bridge, Social Commerce Platform", <<http://www.8thbridge.com/what-we-do>>, accessed on May 29, 2014.
V.A. Kansara, "The Next Chapter of Content and Commerce Integration", <<http ://www.businessoffashion.com/2012/11/fashion-2-0-the-next-chapter-of-content-and-commerce-integration. html>> dated Nov. 20, 2012 and accessed on May 29, 2014.

* cited by examiner

*Primary Examiner* — Mila Airapetian
(74) *Attorney, Agent, or Firm* — Ostrolenk Faber LLP

(57) ABSTRACT

Disclosed are a system and a method enabling E-Commerce transactions without redirecting a user's computer from one electronic publishing page to another electronic publishing page.

11 Claims, 19 Drawing Sheets

Fig-9

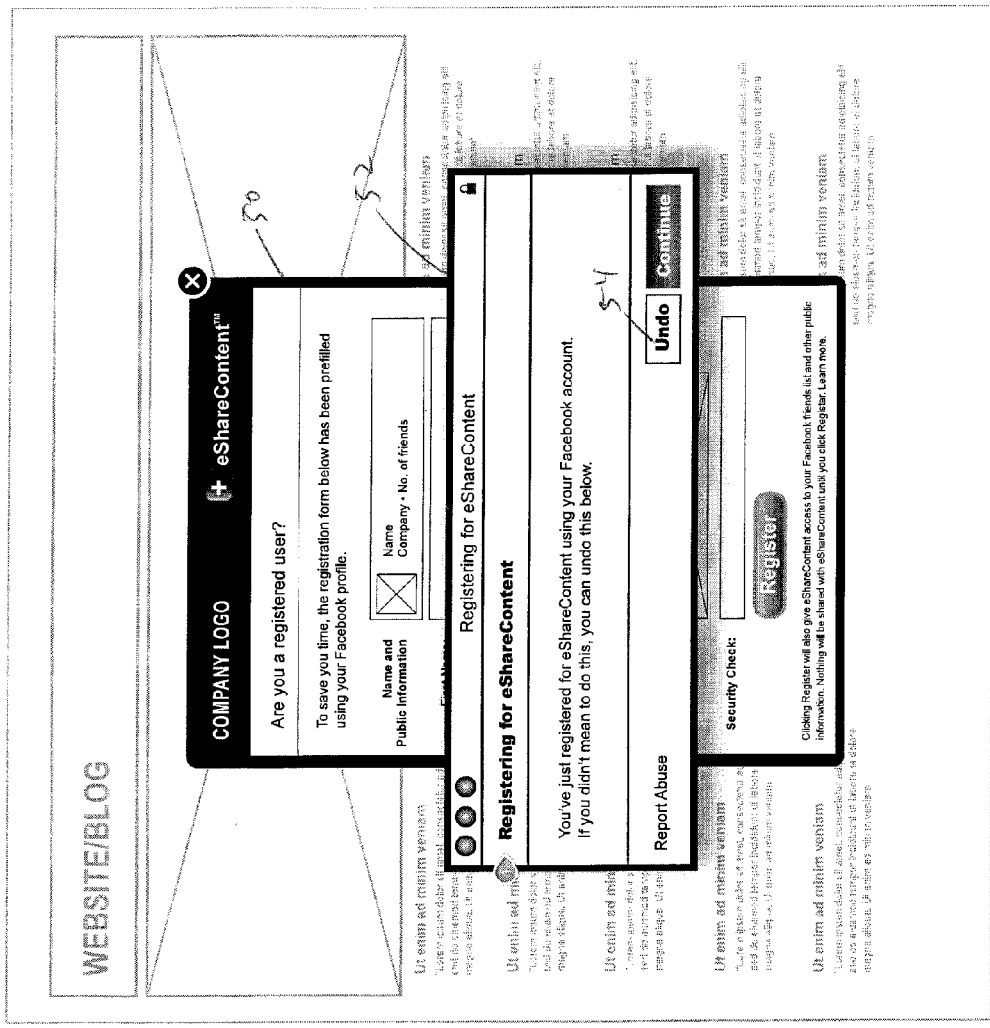

eShareContent

Get eShareContent | Features | Analytics | More

Hi, (Customer email) | Forum | Help

Welcome back (Client name)!

Seller's Product Catalog

Category 1      + Add New Category

| | Product Name | SKU | Description | |
|---|---|---|---|---|
| | Product 01 | LY-PIE9-XIBM | Lorem ipsum dolor sit amet. | Manage Product |
| | Product 02 | WP-ZDC5-AXEQ | Lorem ipsum dolor sit amet. | Manage Product |
| | Product 03 | 4C-24TR-FFOA | Lorem ipsum dolor sit amet. | Manage Product |
| | Product 04 | 5F-IYST-F4Z3 | Lorem ipsum dolor sit amet. | Manage Product |
| | Product 05 | T5-NA59-OZOU | Lorem ipsum dolor sit amet. | Manage Product |
| | Product 06 | NJ-5WN-N9AY | Lorem ipsum dolor sit amet. | Manage Product |
| | Product 07 | EO-YF7D-MF0E | Lorem ipsum dolor sit amet. | Manage Product |

Next Page

SYSTEM FOR E-COMMERCE ACCESSIBILITY

RELATED APPLICATION AND CLAIM OF PRIORITY

The present application relates and claims priority to U.S. Provisional Application Ser. No. 61/618,481 filed Mar. 30, 2012, entitled SYSTEM AND METHOD FOR E-COMMERCE ACCESSIBILITY the entire disclosure of which is incorporated by reference.

FIELD OF THE INVENTION

The present invention relates to a method and a system for conducting an electronic transaction on a network of computers, and more particularly to an electronic sales transaction via a network of computers.

DEFINITIONS

A web page or webpage as used herein refers to an electronic document/file residing on a computer (sometimes referred to as a server) in a network of computers that may be accessed by a web browser for the purpose of displaying information including text, graphics and the like to a user via an electronic display.

A web site or website refers to a set or a collection of interrelated web pages residing on a computer or a number of computers in a network of computers and accessible by a user via an electronic address typically referred as a uniform resource locator (URL) or web address.

A browser or web browser refers to a software application for accessing, retrieving, presenting (displaying), and traversing information residing on computers in a network of computers including websites, web pages, weblogs (blogs) or the like.

Click and its grammatical variations refers to operating a pointing device associated with a computer (e.g. a mouse) to select an item on the electronic display of the computer, which leads to the activation of a command or function which is executed by the computer associated with the display.

E-commerce refers to a series of electronically executed steps over a publicly accessible network of computers (e.g. Internet) that at the very least includes steps for offering a product or a service for sale by a seller or a seller's agent and steps for collection of payment information (e.g. credit card information) from a buyer.

Electronic publishing page refers to any electronically transmittable computer readable file for the display of content such as text, graphics, or a combination of text or graphics or the like on an electronic display such a computer monitor including a graphical/photographic display advertising unit, a textual advertising unit, a textual editorial content (i.e., blogs), a graphical display editorial content (i.e. digital banners), a dynamic display unit such as video content or animated content, a user-generated social commentary and/or imagery, a sponsored (paid) social commentary and/or imagery, or a hybrid of any of these.

BACKGROUND AND SUMMARY OF THE INVENTION

A conventional method of inducing an e-commerce transaction includes offering a product through electronic advertising via a computer network.

A well-known method of conducting e-commerce includes electronic advertising by displaying a graphic on a webpage of a website that is hyperlinked to another webpage in another website (meaning that the another webpage is not in the collection of web pages constituting the website of the web page on which the graphic is displayed). When a user clicks on the graphic, the browser associated with the user's computer is directed to the another web page. Once the browser is directed, and the browser displays the another web page, the user is able to conclude the e-commerce transaction (i.e. purchase the advertised product).

A method according to the present invention enables an e-commerce transaction without redirecting the browser to another webpage, where the remainder of the e-commerce transaction may be conducted. That is, in a method according to the present invention the user's browser is not directed to another web page (i.e. a web page associated with another web site) and remains directed to the web page while an e-commerce transaction is conducted.

In a method according to the present invention, once the user selects an information object displayed on a web page, to which the browser is directed, the e-commerce transaction is conducted without redirecting the browser.

An information object may be a moving or a static electronic image and/or a textual object (e.g. a brand, a phrase containing a brand, etc.).

A system according to the present invention, is an E-Commerce technology platform (and application) that enables seamless E-Commerce transactions from any electronic publishing page (e.g. a branded Blog, a social media web page, a website, Email, etc.).

A system according to the present invention provides access to a Client Application Programming Interface ("API"), which can be installed within any electronic publishing page. Once a user accesses the electronic publishing page using a computer and its contents are displayed to the user by a monitor associated with the user's computer, the API will enable the user's (client's) computer to interface with a system according to the present invention so that the two systems can communicate with one another. Once the API is captured from a system according to the present invention and installed, E-commerce transactions may be conducted without redirecting the web browser to another web page of another web site, thereby adding E-commerce functionality directly to the electronic publishing page itself.

Thus, for example, as a user reads the content of an electronic publishing page (i.e. Blog article) the user can click an information object, which will lead to the display of an information window. The information window may include a plurality of product information sections each section providing information regarding a product and at least one action button associated with the product in the information section. The action button can be configured to lead the user through the steps that will conclude an E-commerce transaction.

The steps leading to the E-commerce transaction may include a registration step either directly or through a third party web site where the user is already registered (e.g. Facebook Connect, etc.).

Once a user is registered, the user may interact with the system to conduct an E-commerce transaction from any electronic publishing page that includes an information object.

A system according to the present invention can be implemented with any electronic publishing platform including electronic social networking services, blogs, web sites, Email etc.

Each information section may also display an action button, which when clicked by the user, enables the sharing of the information in the associated information section with members of the user's network in a number of convenient ways (via email, social networks, etc.). The members of the user's network will then also be able to conduct an E-commerce transaction in the same manner as the user.

Sellers of products can use a system according to the present invention to configure/customize information windows displayed to the users and direct the system to add E-commerce capability to designated electronic publishing pages.

Furthermore, a system according to the present invention can provide the following reports to a registered seller:
1. Daily, weekly, annual Sales of products
2. Sales by location
3. How many people shared information regarding the seller's content and where the information was shared
4. Referrers: A referrer is an electronic publishing page (e.g. a web page) at which at least the E-commerce transaction, which is concluded by or at least through a system according to the present invention, was initiated without the browser being directed to another electronic publishing page.
5. Demo and lifestyle information: This information is demographic and lifestyle information from consumers (users) captured and stored in a database by a system according to the present invention. Examples include spending tiers, content type, category type and any demographic/lifestyle information (age, sex, product interests, etc.,) and other information that can be appended through other databases.

A user/potential buyer experiences the following when interacting with a system according to the present invention:
1) On a particular web page, the user clicks on the information object and the system auto-detects if the user is a registered user.
2) If so, an information display window will be displayed to the user that displays one product information section or a plurality of information sections each displaying information regarding a respective product. Each information section provides the user with an option to add the product to a virtual shopping bag and/or to share the information regarding the product in that information section with the user's network via, for example, an electronic social networking service.
3) Once the user's selection is placed in the virtual shopping bag, optionally, other items are displayed to induce another sale (upselling).
4) Once the user confirms the intent to conclude the purchase, an additional discount to the purchase price or a free sample may be offered to the user if the user agrees to share information relating to the product through an electronic social networking service.
5) Thereafter, payment information is collected from the user and processed by the system to conclude the E-Commerce transaction. A receipt may be then emailed.
6) For a new user, personal information, credit card and shipping information are obtained after the user has directed the placement of a selected product in the virtual shopping bag.
7) A user may check out as a guess without registration with the system. Only credit card and shipping information are obtained in this case.
8) A discount may be applied to new users upon confirmation of the purchase.

A seller of a product may experience the following when using a system according to the present invention:

1) A new seller may first register with a system according to the present invention through a website associated with the system. To register the seller provides to the system preferably via the website its name, gateway information and account information.
2) The company's profile will be customized with its brand identity meaning that the creative, copy and other branding elements will be incorporated into the design of the page templates and rendered displayable within the information displays sequentially displayed to the user during the E-commerce transaction.
3) The seller will then be able to populate the system with seller's product information. The seller can choose various templates for presenting the product information in an information display window and may designate which template is used for which electronic publishing page.
4) The system then associates each template customized with the seller's products with the designated electronic publishing pages designated by the seller.

Other features and advantages of the present invention will become apparent from the following description of the invention, which refers to the accompanying drawings.

BRIEF DESCRIPTION OF THE DRAWINGS

FIG. 9 illustrates a fillable form providing the user with options to automatically populate a registration form through a third party service.

FIG. 11 illustrates a window that provides a user with the option to abort the registration process.

FIG. 12 illustrates information made available to a registered seller by a system according to the present invention.

FIG. 14 illustrates a web page accessible by a registered user that can be used to customize a product display window for the seller's products.

FIG. 15 illustrates a web page accessible by a registered user that can be used to customize other features by the registered seller including customization of each feature in view of a selected platform.

DETAILED DESCRIPTION

A system according to the present invention includes a central processing center (CPC) which is one computer (server) or a plurality of interconnected computers (servers) configured to provide the necessary computer executable instructions, computer executable code, and information to a user's computer or a seller's computer to realize the functionalities described herein. The CPC in a system according to the present invention is also configured to retain and process information received from a user's computer or a seller's computer.

A system according to the present invention will include a CPC that can be selectively connected to communicate with user computers, seller computers, and computers hosting electronic publishing pages via, for example, a publicly accessible computer network such as the Internet.

Figure 1:
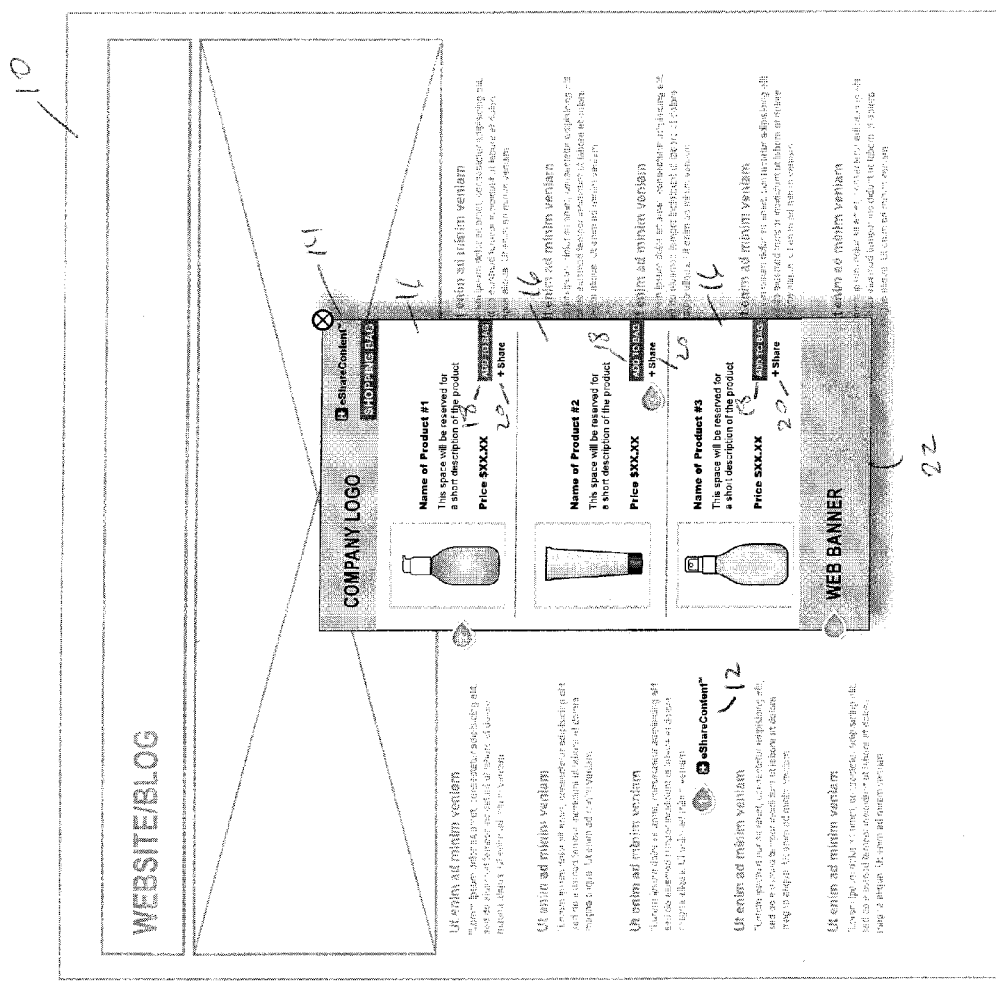
FIG. 1 illustrates a product display window generated and displayed over a web page according to a first embodiment of the present invention.

FIG. 1 depicts a web page 10 to which a browser on a user's computer is directed. Web page 10 is enabled to display an information object 12. After clicking information object 12 a product display window 14 is opened while web page 10 is still displayed behind product display window 14. Thus, the launching of the product display window 14 does not lead to the redirection of the browser from web page 10 to another web page associated with a different web site.

Product display window 14 may include one information section 16, or a plurality of information sections 16. Each information section 16 may display information relating to a product, for example, the name of the product, a description of the product, and its price.

Each information section 16 may further include one action button or a plurality of action buttons. Each action button, when clicked, sends a command to the user computer that is associated with the display on which web page 10 is displayed to cause the computer to perform a function (e.g. execute a set of computer executable codes).

Action button 18 in each information section 16 enables the user to add the selected product to a virtual shopping bag as is well known in the field. Thus, when the user clicks action button 18 in one information section 16, the user's computer executes a series of codes that leads to the addition of the product described in that information section to a virtual shopping bag.

Action button 20 in each information section 16 enables the user to share the information pertaining to the product listed in the information section with a group of users through an electronic social networking service (e.g. Facebook®) as is well known in the field. Thus, when the user clicks action button 20 in an information section 16, the user's computer executes a series of codes leading to the display of information relating to the product described in that information section to a web page of an electronic social networking service.

Window 14 may further include an advertising section 22 that can be used for displaying advertising graphic or the like.

In a preferred embodiment, the clicking of information object 12 triggers a coded AJAX script that launches window 14. Window 14 may be a javascript generated Modal-Box, powered by a javascript framework. The product information sections 16 may be dynamically generated based on the instructions present in the AJAX script.

Action button 20 may also be an AJAX script that calls a list of electronic social networking services and bookmarking services through which the user can share pertinent information on the user's social or bookmarking accounts.

Advertising section 22 may call GIF, PNG or other compatible banner advertisements from advertising distribution servers. These will be periodically refreshed.

In the embodiment shown in FIG. 1, the information object 12 is available to the user within the section designated of web page 10 for the display of content (e.g. text).

Figure 2:
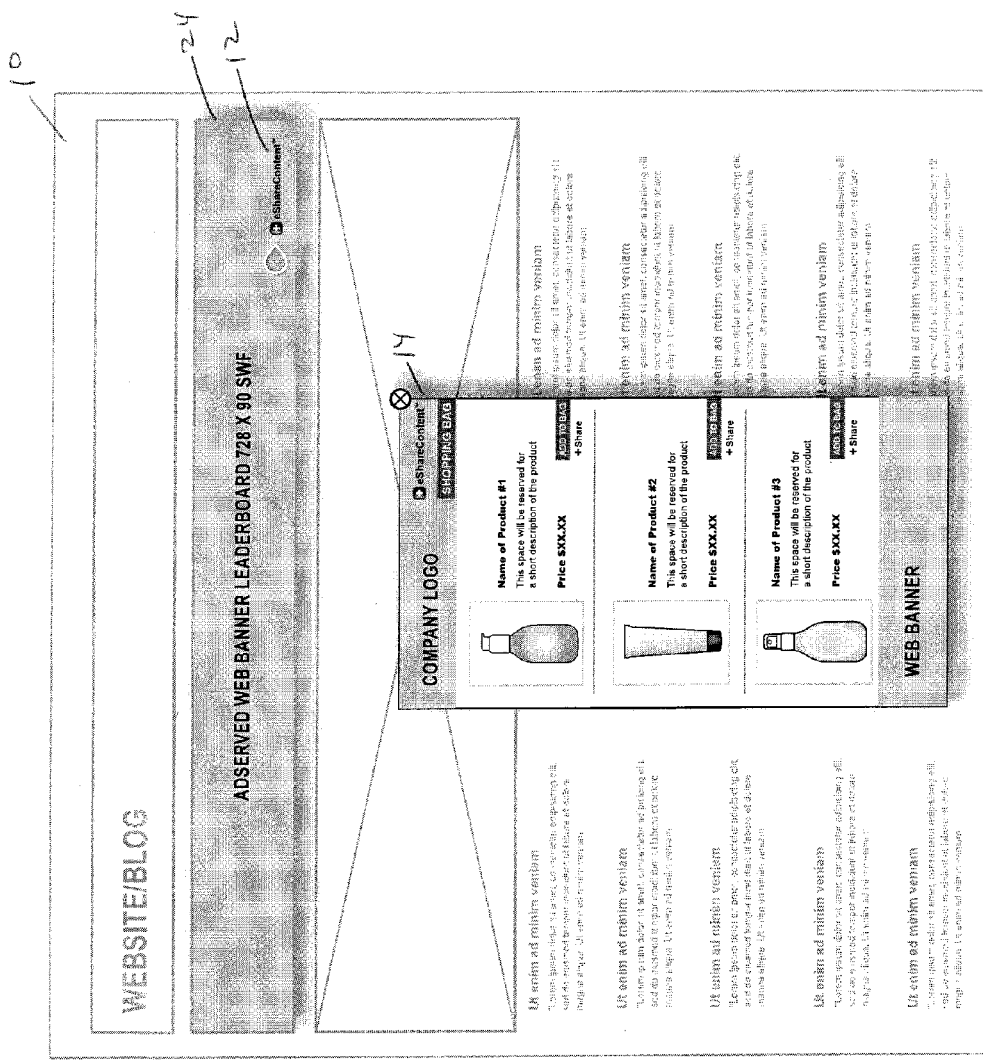
FIG. 2 illustrates the window shown in FIG. 1, generated according to a second embodiment of the present invention.

Referring to FIG. 2, in a second embodiment, information object 12 can be provided in association with a web banner 24 (e.g. a graphic) displayed along with the content of the web page.

Upon clicking information object 12, window 14 as shown in FIG. 1 is displayed by the browser for the user to view. Note that web page 10 remains displayed in the background behind window 14 since the browser is not redirected to another web page.

According to an aspect of the present invention, the computer associated with the user's display generates window 14 for display by the browser based on a series of computer executable codes (CEC), which have been configured and customized by the seller of the product. The CEC may be sent to the user's computer from the CPC when information object 12 is clicked and executed by the user's computer, or the CEC may reside on a different computer and executed by a computer other than the user's computer. The execution of the CEC enables at least communication between the CPC and the user's computer. While in communication the CPC and the user's computer may exchange computer executable instructions and information. The information supplied to and received by the CPC may be provided by the user via one or more graphic user interfaces which are generated based on code supplied by the CPC and displayed by the browser residing on the user's computer.

Note that information object 12 can be customized for any type of advertising banner. A SWF banner will contain an ActionScript button that calls ActionScript programming to generate a call to action to start the process, namely to generate the windows (e.g. pop-up windows) and fillable forms for conducting the transactions (e.g. E-Commerce transactions, registration etc.), whereas GIF/PNG/JPG banners call an appropriate JavaScript function to do the same as the SWF banner as described herein. Mobile compliant ad servers can substitute SWF banners when available so that information relating to the products can be viewed on non-Flash supporting mobile devices. The information object 12 may also be accessed from within web banners.

Figure 3:
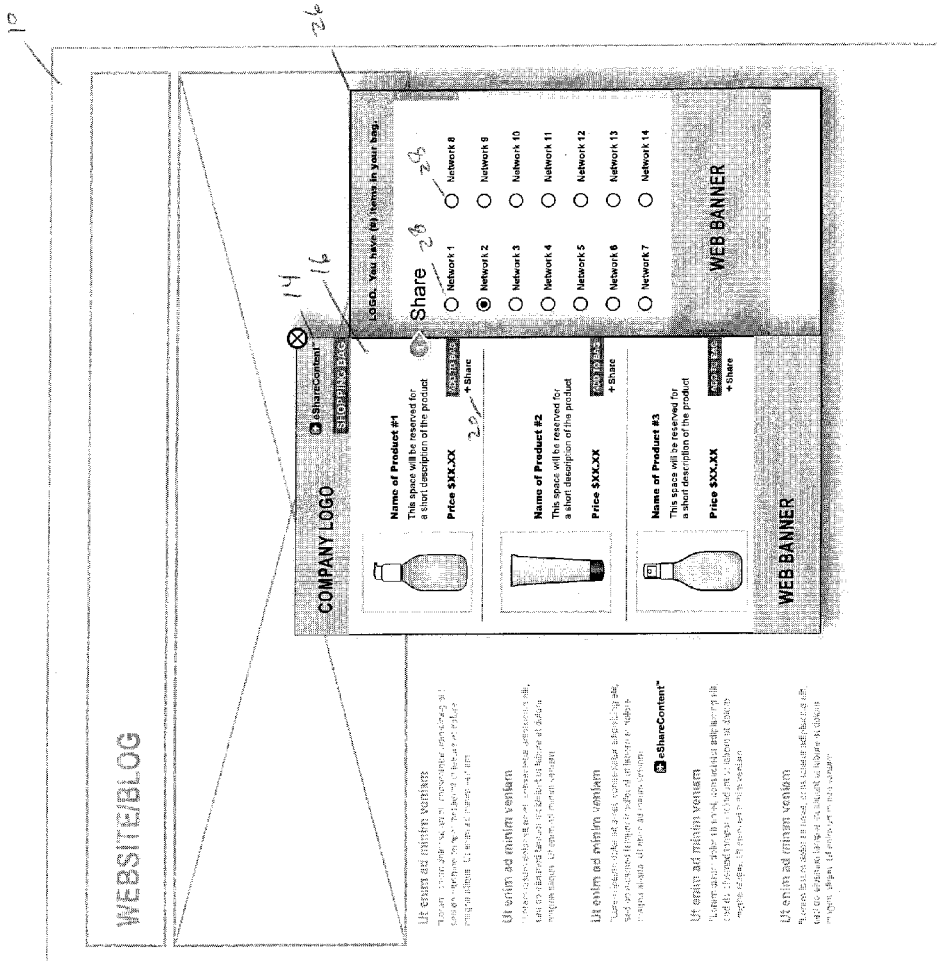
FIG. 3 illustrates a selection window generated in response to a user's clicking of an action button in the window shown in FIGS. 1 and 2.

Referring now to FIG. 3, once action button 20 is clicked by the user, a first electronically fillable form 26 is generated and displayed for the user by the user's browser. Form 26 includes a plurality of virtual buttons 28 each associated with an electronic social networking service. The user may select one electronic social networking service or two or more such services. The selection leads to the transmission of information related to the product associated with the display section 16 that is also associated with the clicked action button 20 to the selected social networking service.

Figure 4:
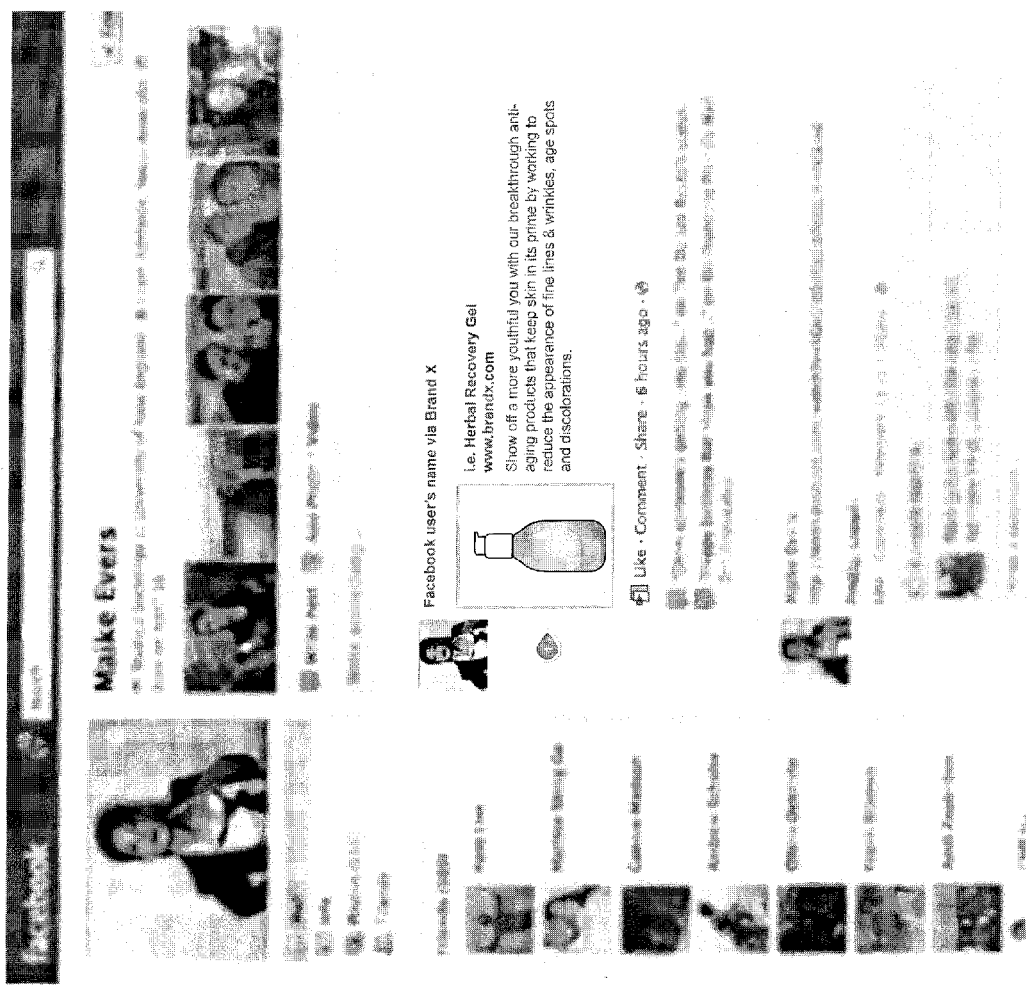
FIG. 4 illustrates a web page displaying product information in response to a user's selection from among the choices provided in the selection window shown in FIG. 3.

For example, as shown in FIG. 4, information relating to the item in information section 16 is then displayed on a web page of a selected electronic social networking service, in this case web page available through a well known service called Facebook.

Optionally, information regarding the product can also be shared on other people's walls, or tagged to specific people. Sharing, depending on the social networking services API, can either occur within the same page, or within a different browser tab or window. The shared information will then be displayed on the social networking services web site, which will open in a new tab or window.

Sharing is preferably handled by an API connected to a portal that lists available social networks and bookmarking services for media distribution. The user will have to be logged into his preferred networks, or will be prompted to log in before sharing.

Figure 5:
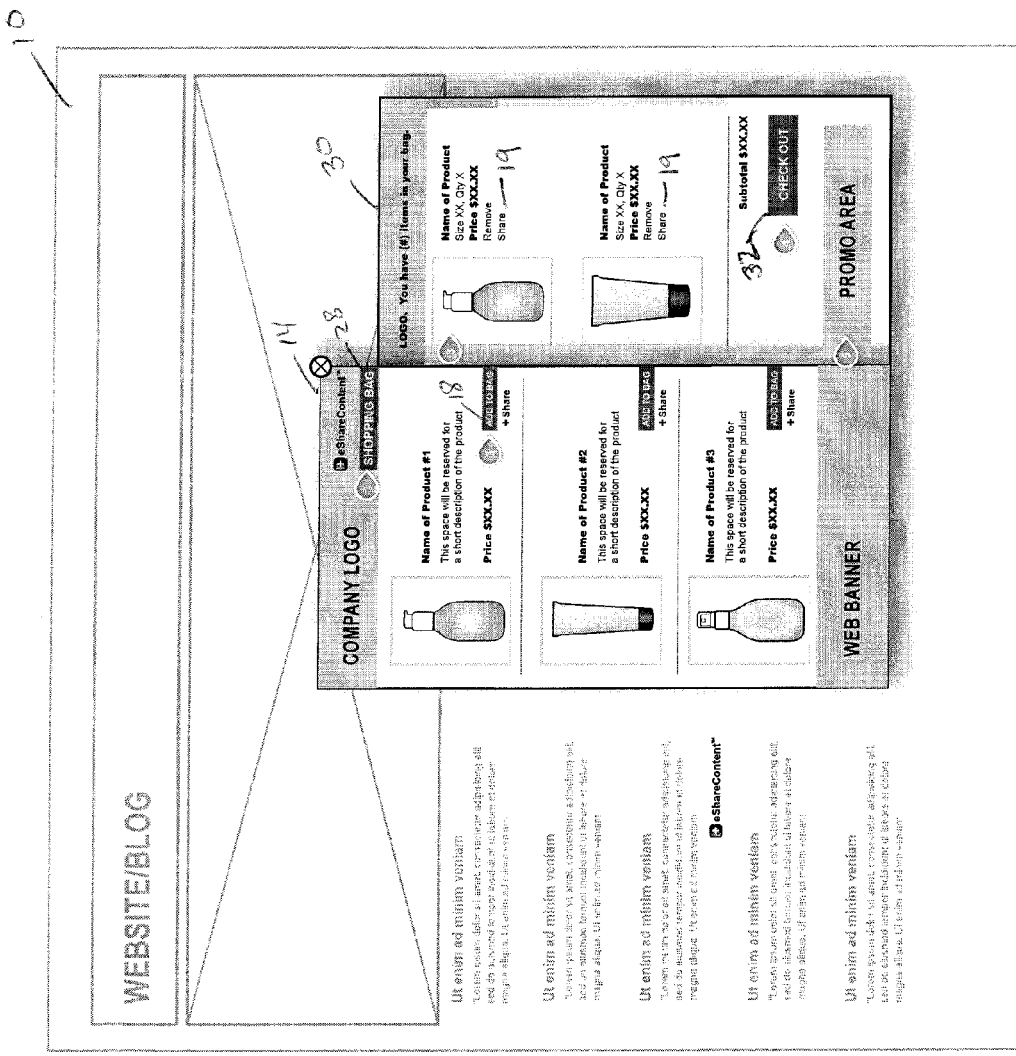
FIG. 5 illustrates a first check out window displaying product placed in a virtual shopping bag by the user.

Referring now to FIG. 5, window 14 further displays action button 28. When action button 28 is clicked by the user a first e-commerce window 30 is generated to display products placed in the virtual shopping bag.

Before any information is processed from the generated shopping bag listing (AJAX frontend script) to the CPC (backend), it undergoes an encryption process that securely transmits information such as the User ID, product list, prices, and other relevant information to the CPC, where it is decoded. The clicking of action button 18 stores a script within the user's browser cookies, remembering items marked, quantities, cost, and other relevant information. This script clears this information once the session is closed, either by javascript function, or when the browser is terminated. Products in the virtual Shopping bag are preferably described in terms of name, appearance (thumbnail), preferred size if applicable, quantity, and price. An additional action button 19 is also provided in window 30.

Figure 6:
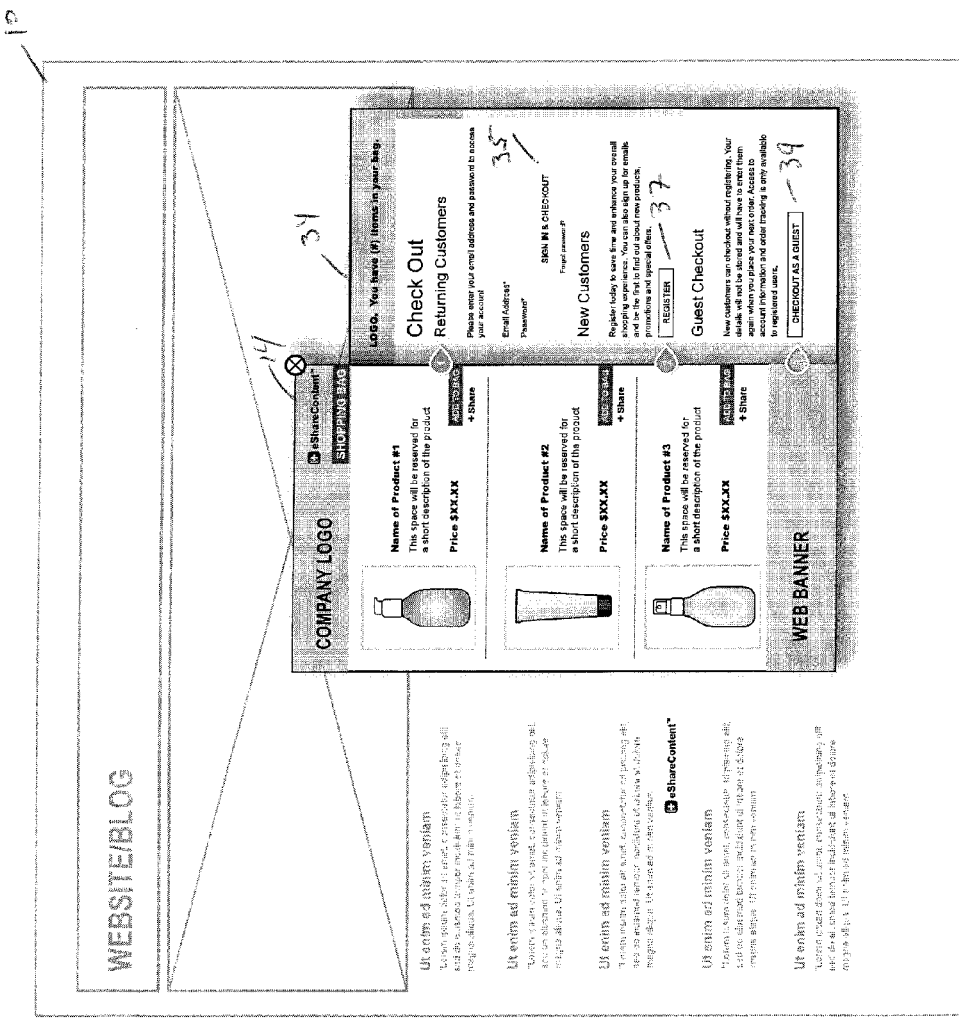
FIG. 6 illustrates a second check out window displaying different user categories.

Window 30 includes a check out button 32, which when clicked by the user, generates and displays a second e-commerce window 34 as shown in FIG. 6. Second e-commerce window 34 preferably allows the user to make one of three selections. Specifically, the user may select to further proceed with the e-commerce transaction as a returning customer 35 (i.e. a customer that has registered with the CPC), a new customer wishing to be registered 37 with the CPC, or a customer who wishes to continue without registering 39 with the CPC (a guest).

A guest can checkout without registering. The details of the transaction will not be stored in the CPC.

The system may provide access to account information and order tracking to registered users.

A system according to the present invention recognizes a registered user and generates a script based on the user's login credentials, which is then sent to the CPC (securely) for processing. A cookie is generated, which will be available for the remainder of the user's session.

Figure 7:
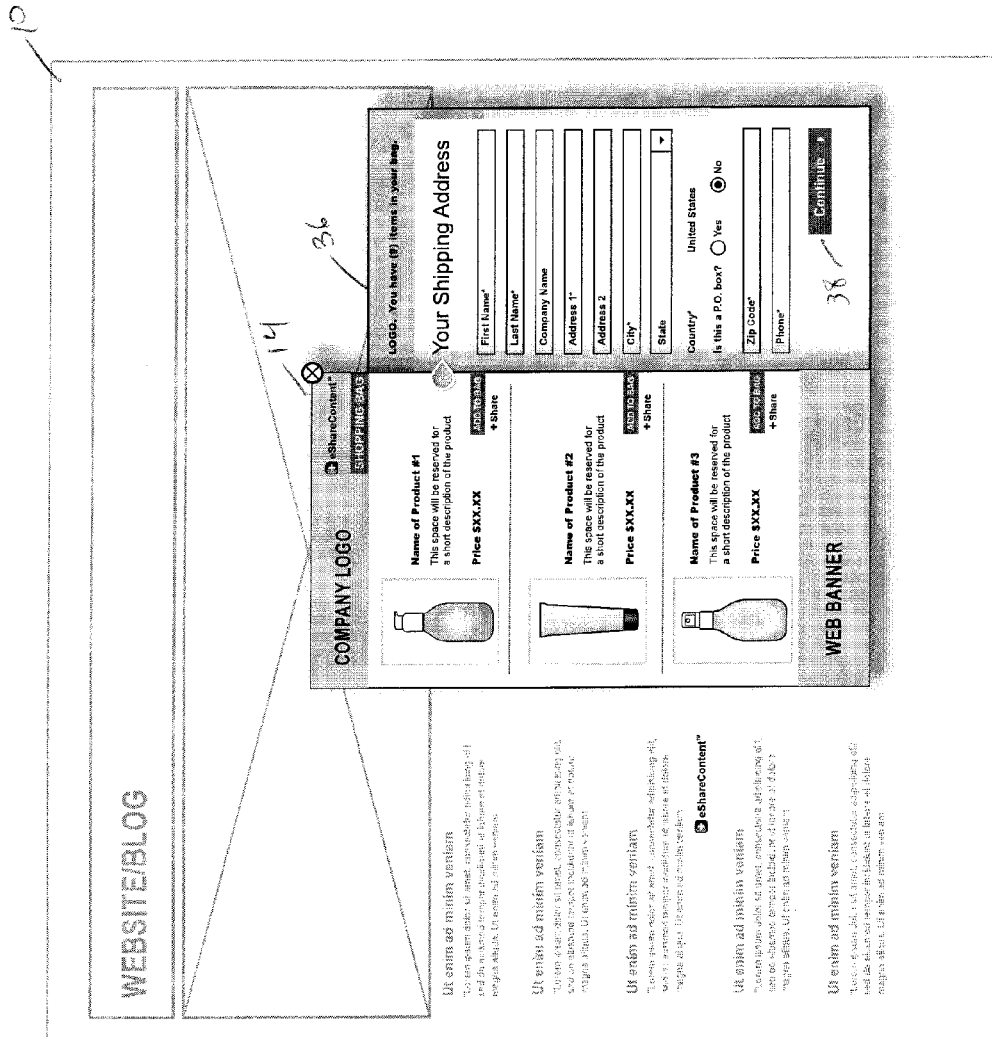
FIG. 7 illustrates a third check out window displaying a fillable form for obtaining shipping information from the user.

Upon selection of one of the options by the user, a third e-commerce window 36 is generated and displayed as shown in FIG. 7. Third e-commerce window 36 is an electronically fillable form that allows the user to enter his/her shipping address, telephone number, etc. The information so entered is then received by the CPC. Third e-commerce window 36 displays action button 38. Upon clicking action button 38, another e-commerce window is generated and displayed to collect payment information from the user. The payment information is then sent to and received by the CPC for payment processing to conclude the e-commerce transaction. A notification that includes a receipt for the transaction may be then optionally sent to the user electronically (e.g. via e-mail).

In the preferred embodiment, the electronic fillable forms are AJAX generated and are transmitted using a similar security algorithm used in conjunction with the virtual shopping bag uses. Form fields may be validated both using client-side and server-side scripts.

Figure 8:
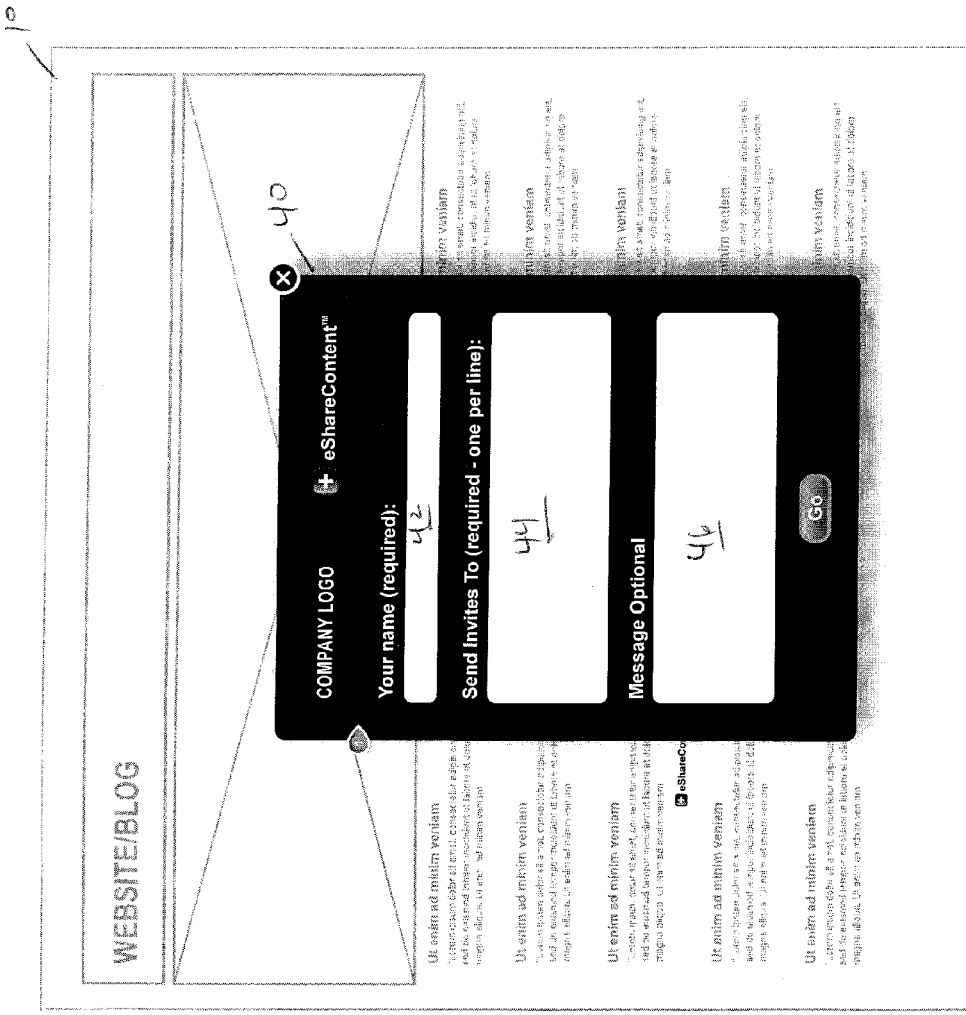
FIG. 8 illustrates a fillable form for obtaining information that is useful in sending out electronic invitations to a user's invitees.

Referring back to FIG. 6, if the user selects to register as a new user, as part of the registration process, the user may be enabled to send out electronic invitations to other users. FIG. 8 illustrates an electronically fillable form 40 that includes fillable field 42 in which the user may enter his/her name, a fillable field 44 in which the user can enter e-mail addresses of the invitees, and a fillable field 46 in which the user can enter a short message directed at the invitees.

Preferably, an SSL-enabled mailserver handles the distribution of email invitations, compliant with SpamAssassin and other anti-spam standards.

Figure 9:
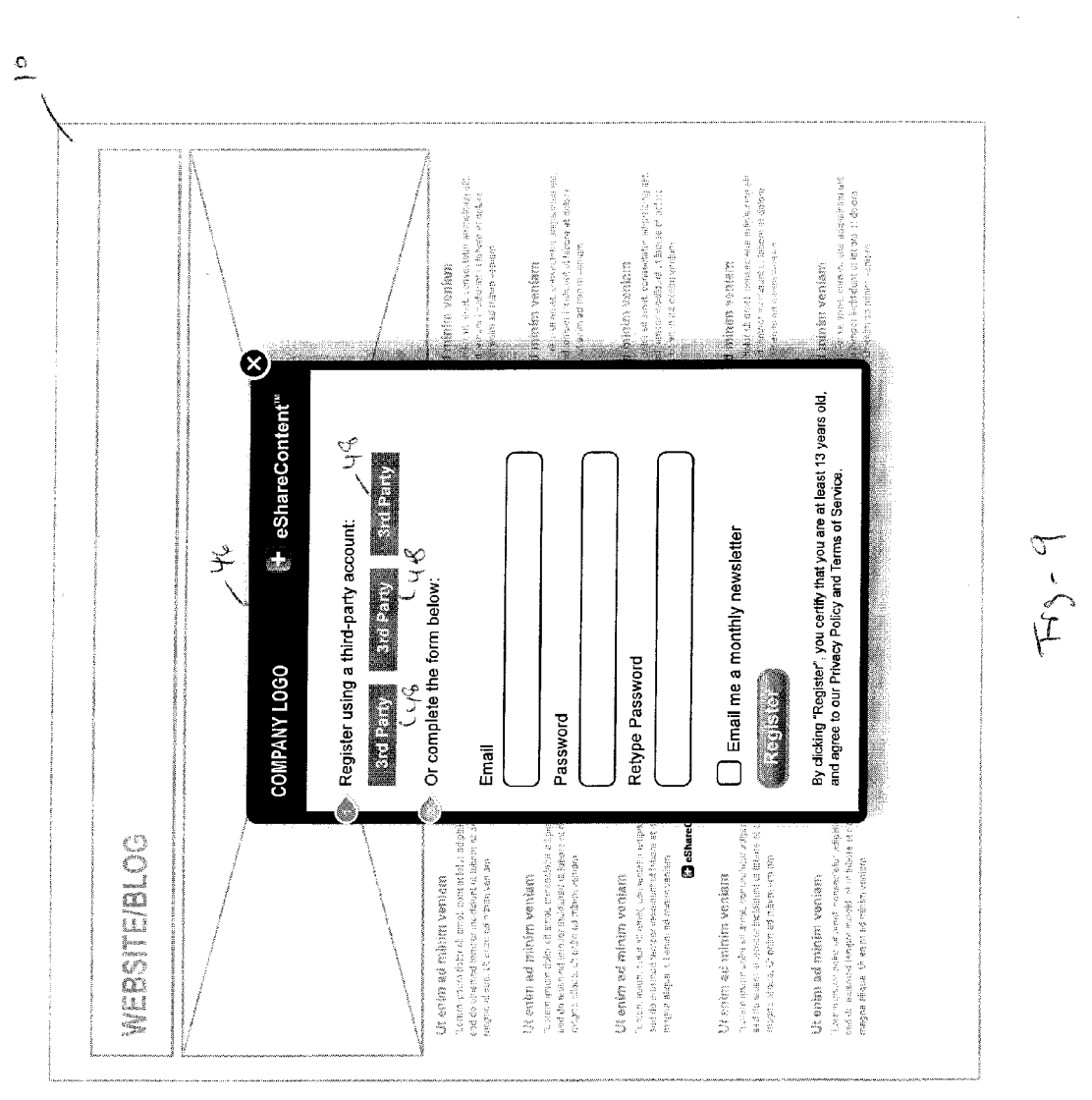
Figure 10:
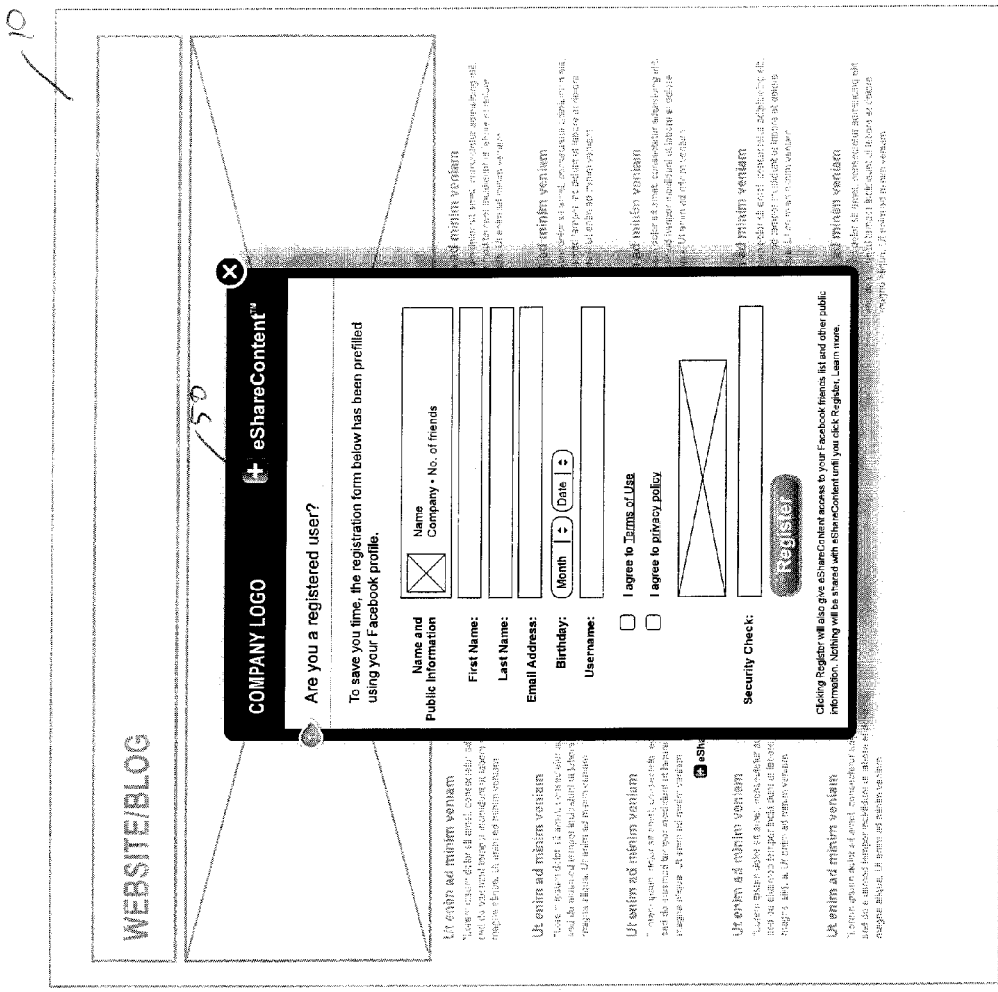
FIG. 10 illustrates a fillable registration form.

Referring now to FIG. 9, as an alternative, a new user may register through another registered account from a service provided by a third party web site (e.g. an electronic social networking service) other than a web site associated with the CPC. Thus, a window 46 may be optionally provided to the user that includes a plurality of action buttons 48 each associated with a third party social networking service with which the user has registered. By clicking any one of action buttons 48, the user's registration information is obtained from the third party social networking service. Thereafter, a registration window 50 is generated and displayed (see FIG. 10), and each field in registration window 50 is populated with the appropriate registration information obtained from the third party social networking service.

APIs for various third party social accounts will receive security tokens enabling interaction between the CPC and the third party network. A regular form submission process (secure encrypted) is also available. Newsletter requests will be handled by the system's mailserver for processing.

Note that, as is well known in the field, the information provided by the user is validated (at user's computer and at the CPC) and/or the user is directed to populate each field that is empty after the registration information is obtained from the third party social networking service.

Referring to FIG. 11, optionally, a confirmation window 52 may be generated and displayed to the user by the user's browser that includes an undo action button 54. By clicking undo action button 54, the user can undo the registration in which case the CPC will delete the user's registration information.

Preferably, any action that aborts a process, closes a window, terminates the browser session, or otherwise discontinues the process of interacting with the system will trigger a cleanup script that clears all browser cookies generated by the system.

As is readily seen the user interacts with the CPC to conclude an e-commerce transaction and conduct other transactions without the user's web browser being directed to another web page.

A system according to the present invention enables a seller of each product displayed in a window 14 to configure a CEC to generate at least the code necessary for display of window 14 with the seller's product(s) by a user's web browser.

A system according to the present invention further enables a seller to designate a third party web site that will be displaying information object 12 on at least one of its web pages, the activation of which through clicking leads to an e-commerce transaction without leaving that web page of the third party web site.

In a system according to the present invention, each information section 16 is populated with information provided by a merchant/seller to the CPC. To provide product information to the CPC, a seller can set up an account with the CPC by first registering as a seller.

Once registered, a user can upload to the CPC information relating to a product or a number of products. The information so provided will be used by the CPC to enable the display of information window 14 (see e.g. FIG. 1) by a browser.

FIG. 12 shows a listing of a plurality of products associated with a registered seller. The CPC is configured to provide the information shown in FIG. 12 to a registered seller once the registered seller establishes communication with the CPC. The communication may be established through a website associated with the CPC that would enable the seller to send information to the CPC and obtain information from the CPC. The information shown in FIG. 12 may be displayed to a seller via a web browser residing at the seller's computer.

By clicking on Manage Product action button 56, a registered seller may edit the information related to the seller's product(s) through a number of customization web pages available from a web site associated with the CPC to a registered seller.

A register Seller can access a full list of products, and manage the information of one product or multiple products.

Figure 13:
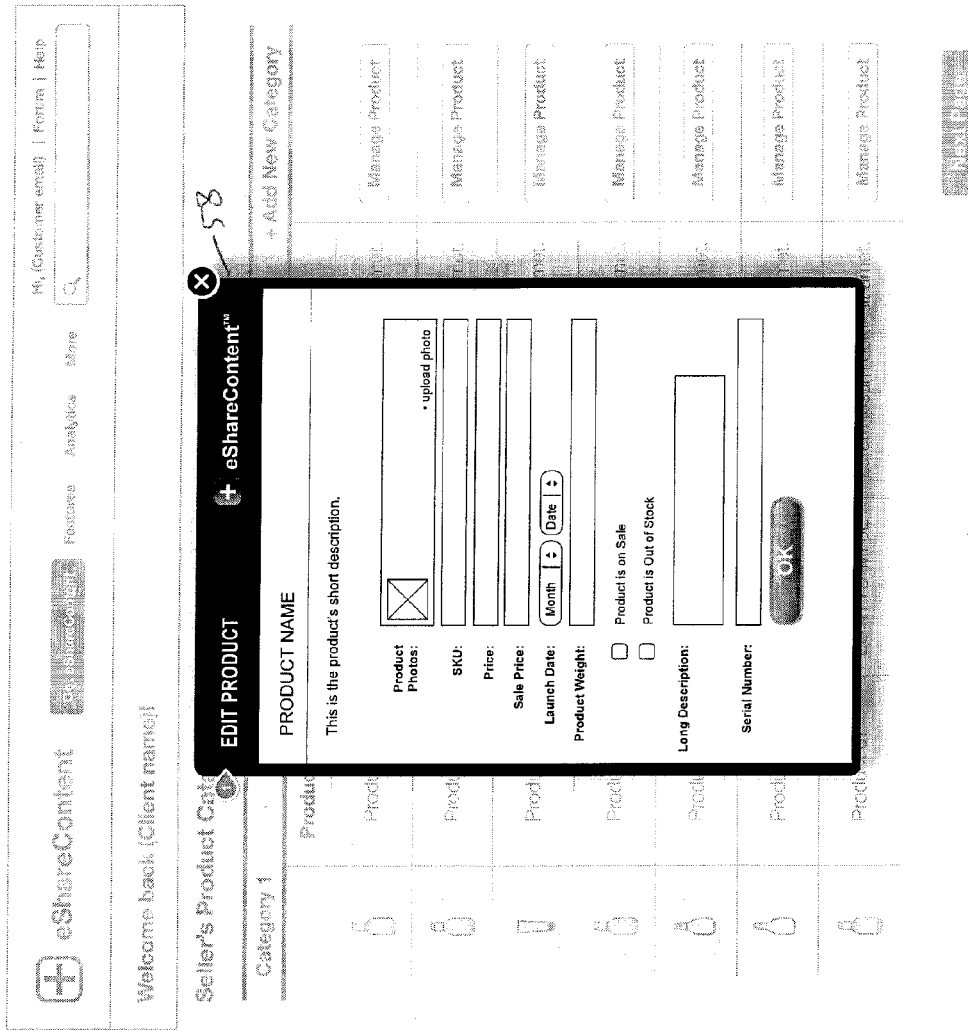
FIG. 13 illustrates a fillable form presented by a system to a registered seller for the purpose of update or adding product information.

FIG. 13 shows a first customization and electronically fillable form 58 provided by the CPC through which a registered user can update the information related to a seller's product(s).

Figure 14:
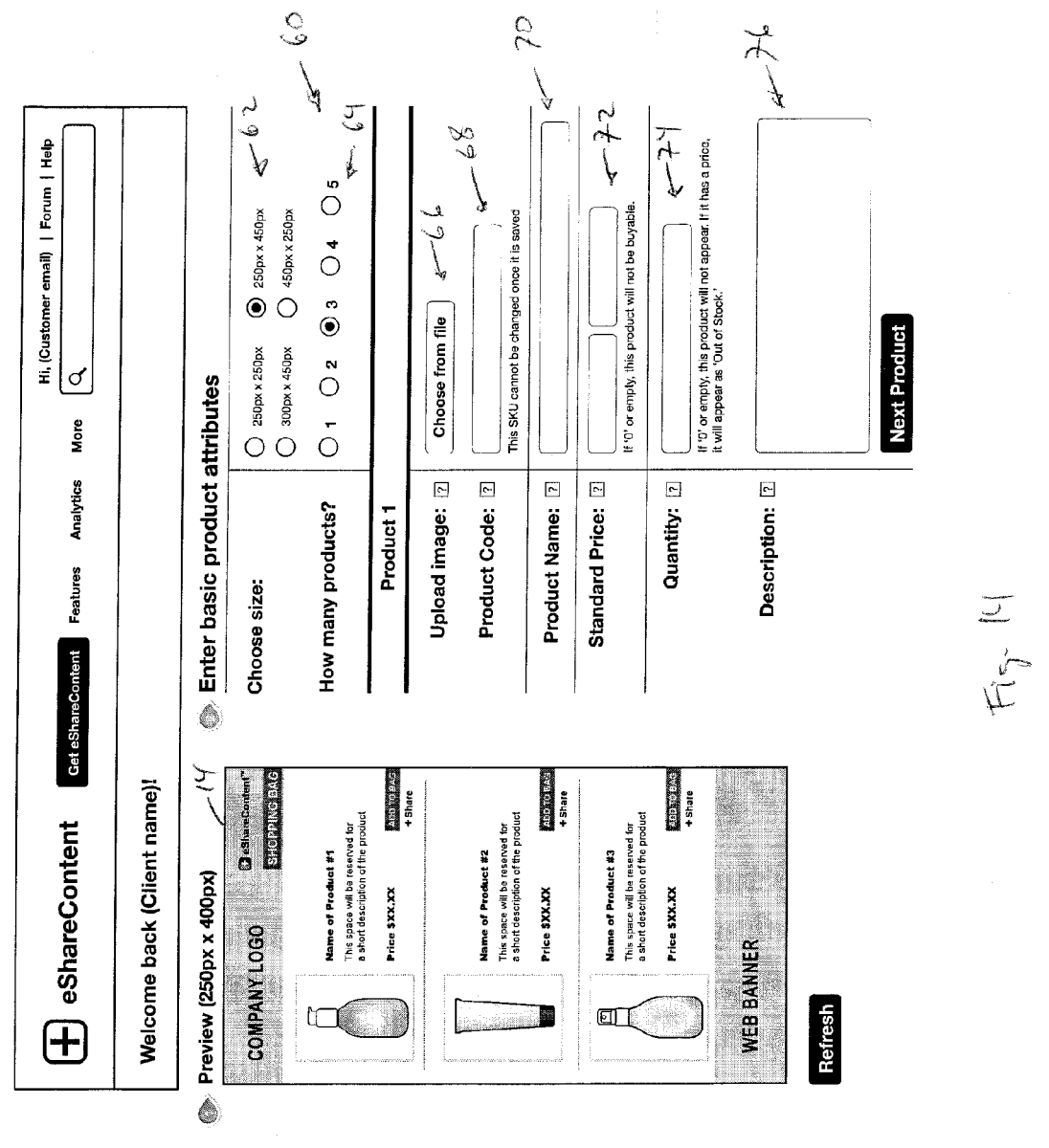

FIG. 14 shows a customization web page accessible by a registered seller configured to display to the seller an electronically fillable form 60 which can be used by a registered seller to devise a window 14 with multiple information sections 16. Form 60 includes a plurality of fillable fields that allow the registered seller to select the size of the window 62, select the number of displayed products 64, select and upload an image file for each product 66, enter a product code 68, enter a product name 70, enter a product price 72, enter the quantity of products available 74, and a description of the product 76. Based on the information CEC is devise by the CPC, which when executed will allow a browser to display a window 14 over a web page of a third party web site according to the seller's specifications and without redirecting the browser to another web site.

Preferably, a registered seller can generate and preview the look of its product display window 14.

While code snippets may be provided by the user, the CPC may parse information from a WYSIWYG editor that generates the code according to the user's instructions.

Figure 15:
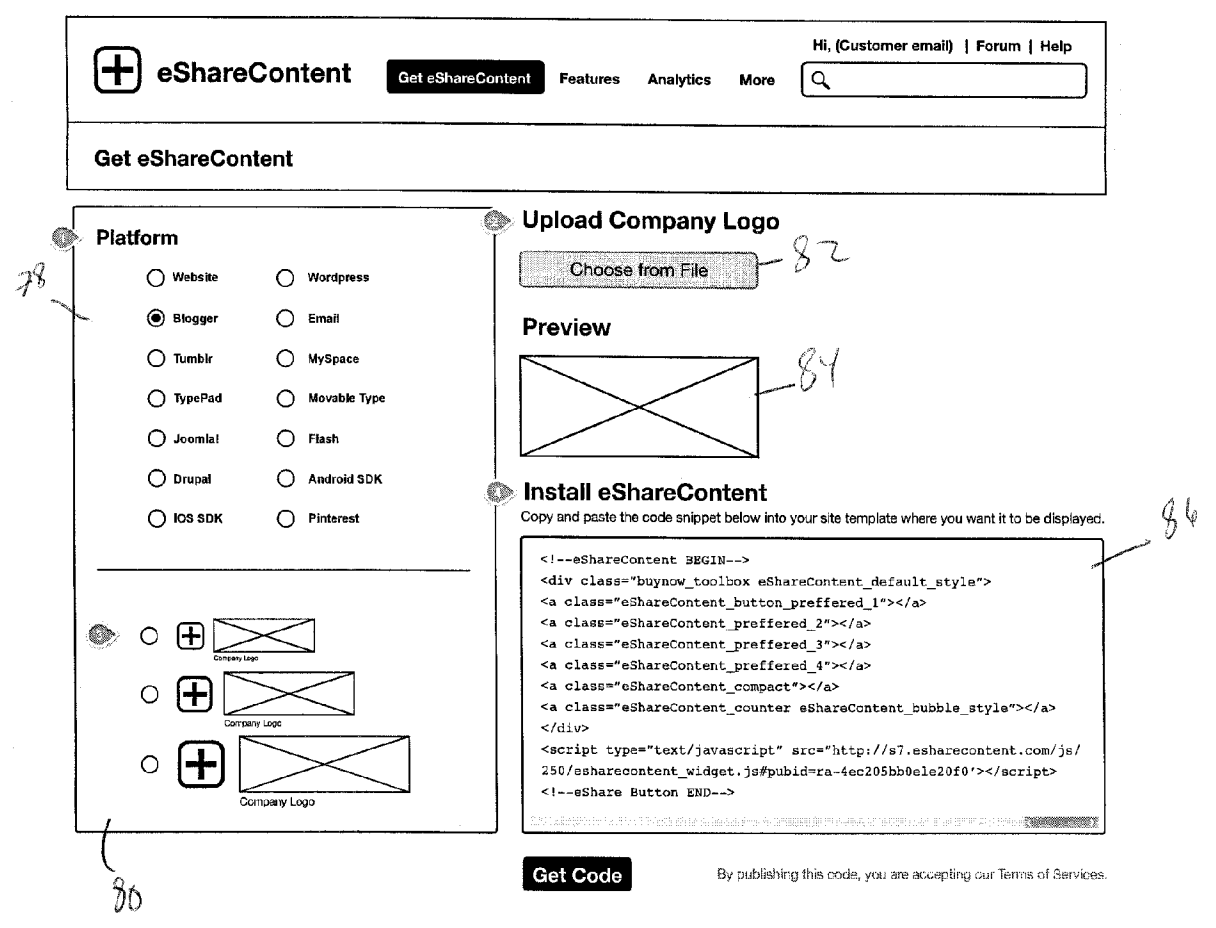

FIG. 15 shows another customization web page accessible by a registered seller. This customization page includes a platform selection section 78 with a number of platform selections each associated with a virtual button. The registered seller may select a platform or a number of platforms by clicking a radio button or buttons. Platform as used herein means an electronic content publishing service operable on a network of computers such as a website, a blog, an electronic social networking service, and so on. A code snippet or a link will be generated suitable for platform that is selected. These can be generated as straight code, as an href, iframe, or as a widget or module for a CMS platform. The code so generated will be displayed in display section 86. The code that is generated can then be copied and inserted into the code of the displaying page to enable the display of content (e.g. product information) and to enable E-Commerce functionality when applied to a webpage, mobile page, display banner, etc.

This page also includes a size selection section 80 that allows the registered user to select a size for a displayable feature, for example, the size of information object 12 or the registered seller's logo or brand.

The customization web page shown in FIG. 15 further includes an action button 82 the clicking of which will allow the registered seller to upload an image file (e.g. an image file for displaying the registered seller's logo). A window 84 is provided for the preview of the uploaded image file (branding mark).

Upload a branding mark will then generate a PNG button. The button can then be resized.

Figure 16:
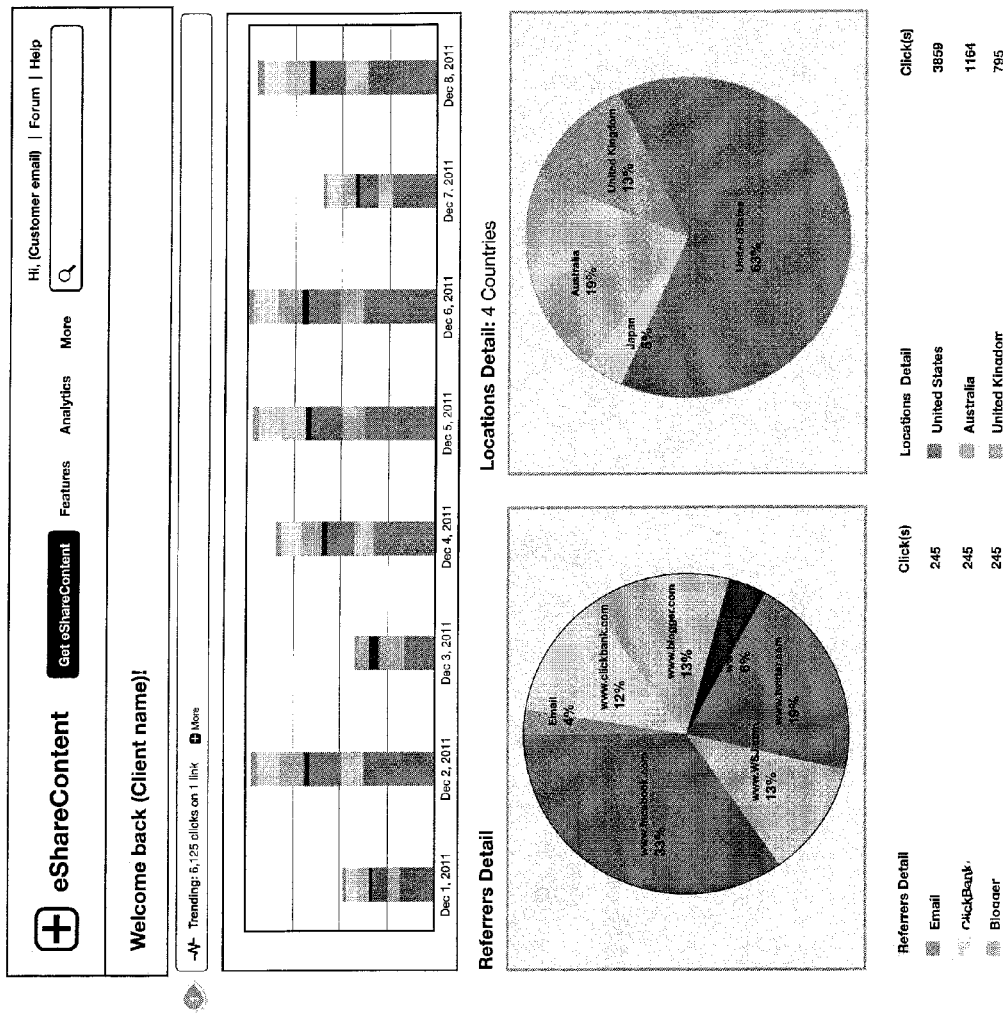
FIG. 16 illustrates a web page accessible by a registered user that can be used to report activity to the registered seller.

A registered seller can obtain information regarding the sale of its products from the CPC. FIG. 16 illustrates an example of a report which can be generated by the CPC and accessed by a registered seller.

The information may include an analysis of buttons' clickthrough rate, with color codes assigned to specific countries or Internet locations.

It should be noted that each action button contains tracking scripts, which then sends analytical information to the CPC. The information is then translated into visual graphs through AJAX functions.

Figure 17:
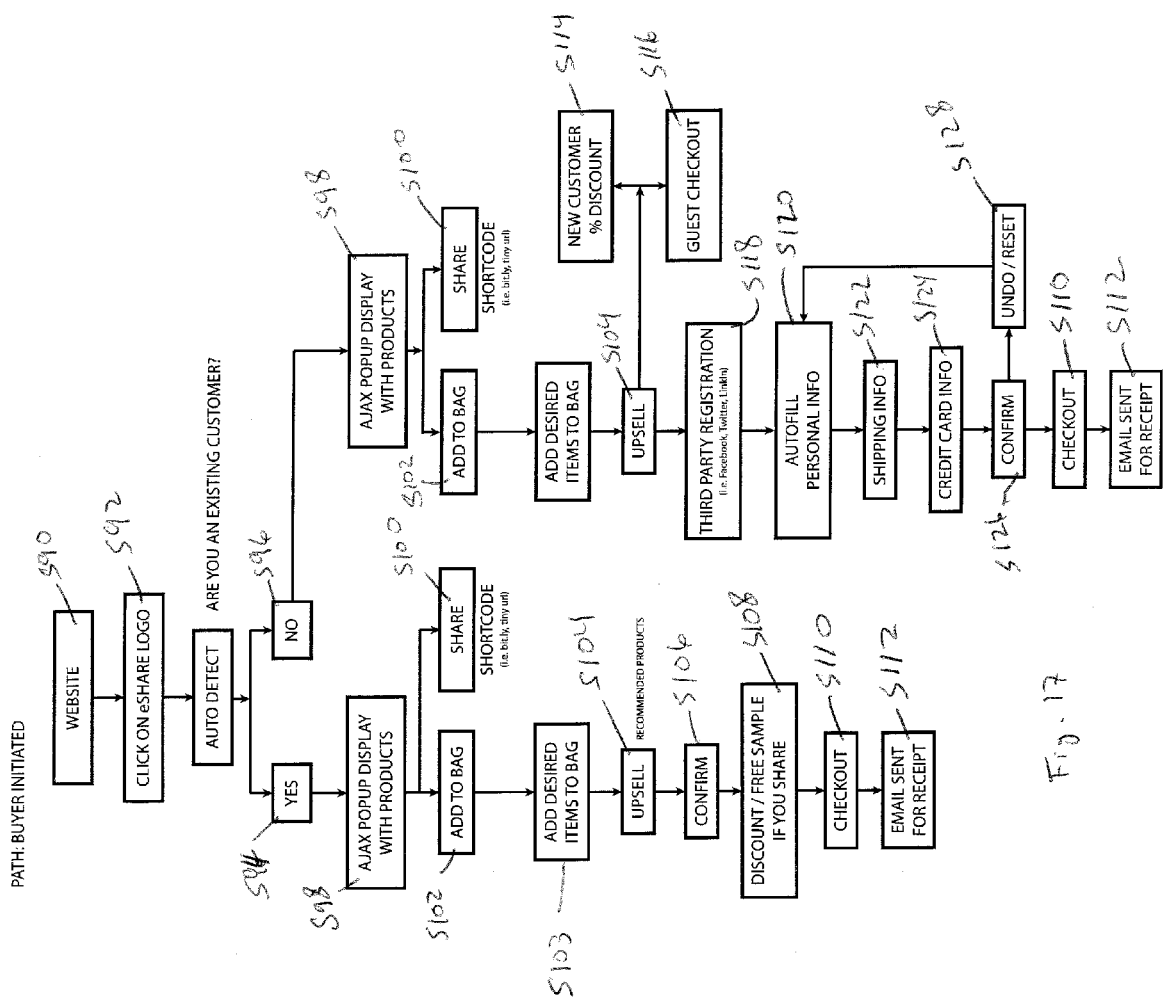
FIG. 17 is a flow chart summarizing user side interactions with a system according to the present invention.

FIG. 17 is a flow chart of the interactions of a user with the system. Once a user directs the browser to a website S90, information object 12 is displayed. Once user clicks an information object 12, S92, the CPC determines whether the user is a registered user S94, or an unregistered user 596. If it is determined that the user is a registered user, a display window 14 is displayed to the user S98. Thereafter, the CPC receives instructions regarding which action to take. If the user clicks action button 20, then the product information in the associated information section 16 is shared with the user's network S100.

If the user clicks action button 18, then the product is added to the virtual shopping bag S102. Optionally, at S103, user may be able to add multiple items to the virtual shopping bag. To enable this option, many items may be displayed with a check box associated with each item so that more than one item may be selected by the user before the next step. At this point, or after the user clicks action button 28 (See FIG. 5), the CPC cause the display of additional information relating to other products in order to induce an additional e-commerce sale/transaction S104, confirms that the user would like to proceed to conclude the e-commerce transaction S106, if the user has not clicked action button 20 associated with the product described in information section 16, offer discount or the like as an incentive to induce the user to click action button 20, S108, and then proceeds to conclude the e-commerce transaction by filing the user's personal information (shipping address etc.), payment information, and payment processing, S110. A confirmation notification in the form of an e-mail may be then sent to the user S112.

If the central processing unit determines that the user is unregistered steps S98, S100, S102 are repeated. At step S104, optionally a new customer discount S114 is offered to the user to induce the user to register as a customer. If the discount is accepted, the user follows a registration process as described above. If declined, the e-commerce transaction is concluded S116 by taking the user's personal information, the user's payment information, and payment processing.

At step S104, the user may elect to register through a third party registration (see FIG. 9 and associated description). If the user makes such an election, the instruction to obtain registration information from a third party is received by the CPC S118, and the user registration form 50 (FIG. 10) is automatically filled out S120. Thereafter, a shipping address for the user, S122, and the user's payment information S124 are obtained from the user. Thereafter, the user is offered the option to confirm the registration S126. If confirmed, e-commerce transaction is concluded S110. If declined, the registration process is reversed S128. Once the e-commerce transaction is concluded a notification (e.g. an e-mail) that may include a receipt is sent to the user S112.

Figure 18:
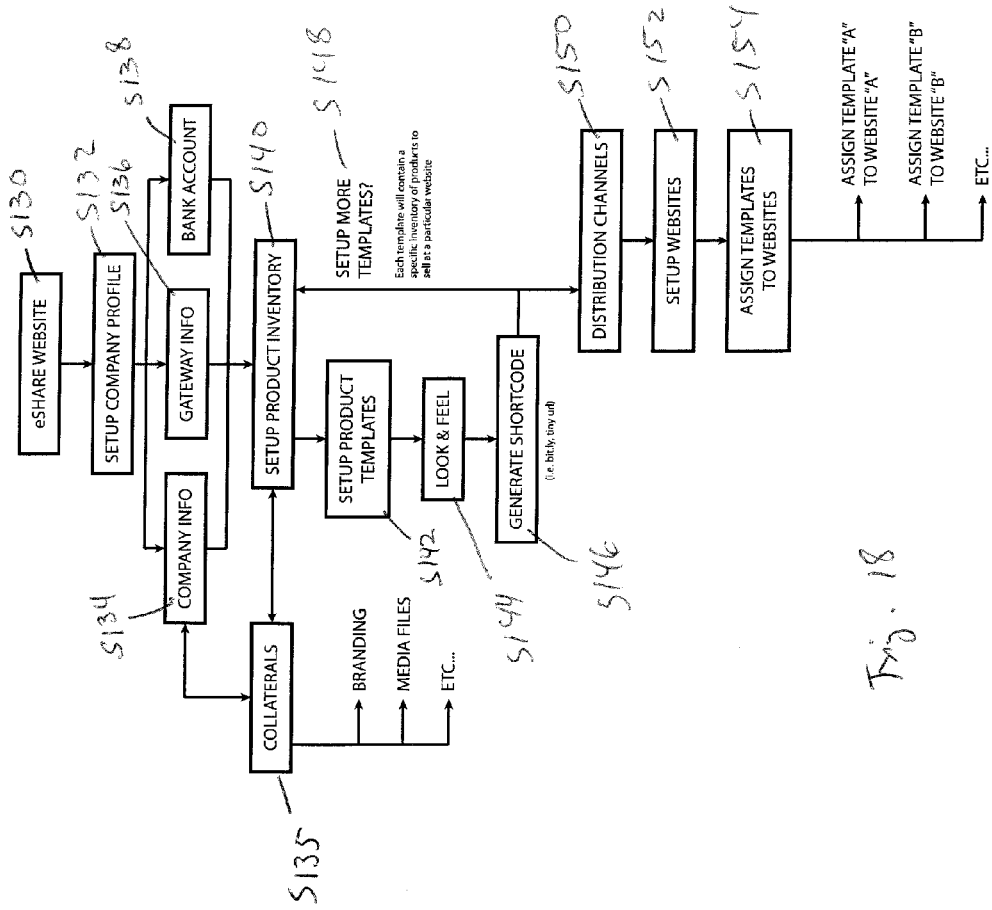
FIG. 18 is a flow chart summarizing seller side interactions with a system according to the present invention.

FIG. 18 is a flow chart illustrating a new seller's interactions with the system. To interact with the system, a new seller first directs a browser to a website S130 associated with the CPC. New seller then enters (and the CPC receives) the seller's company information S134 such as company name, company address, company telephone number, etc; the new seller's gateway information S136; and the new seller's bank account information S138. After entering company information collaterals or brand assets may be uploaded by a seller S135. The brand assets may include imagery, copy, video or any other content that seller may use as branding information. The information so uploaded may be selectively used by the seller to configure content for display to a user as further explained below.

Thereafter, the new seller becomes registered and as a registered seller may set up an inventory of products S140, configure a template for one product or a group of products S142, and select the cosmetic aspects of window display 14, S144. Thereafter, based on the seller's selections, the CPC generates the CEC S146.

The registered seller may have the option of setting up more product templates S148, in which case the system directs the seller back to S140. If the seller selects not to devise more templates, the seller selects distribution channels S150, designates websites or other electronic publishing pages which will be authorized to receive the CEC to enable an e-commerce transaction according to the present invention S152, and assign a different template to each one of the selected websites S154.

Figure 19:
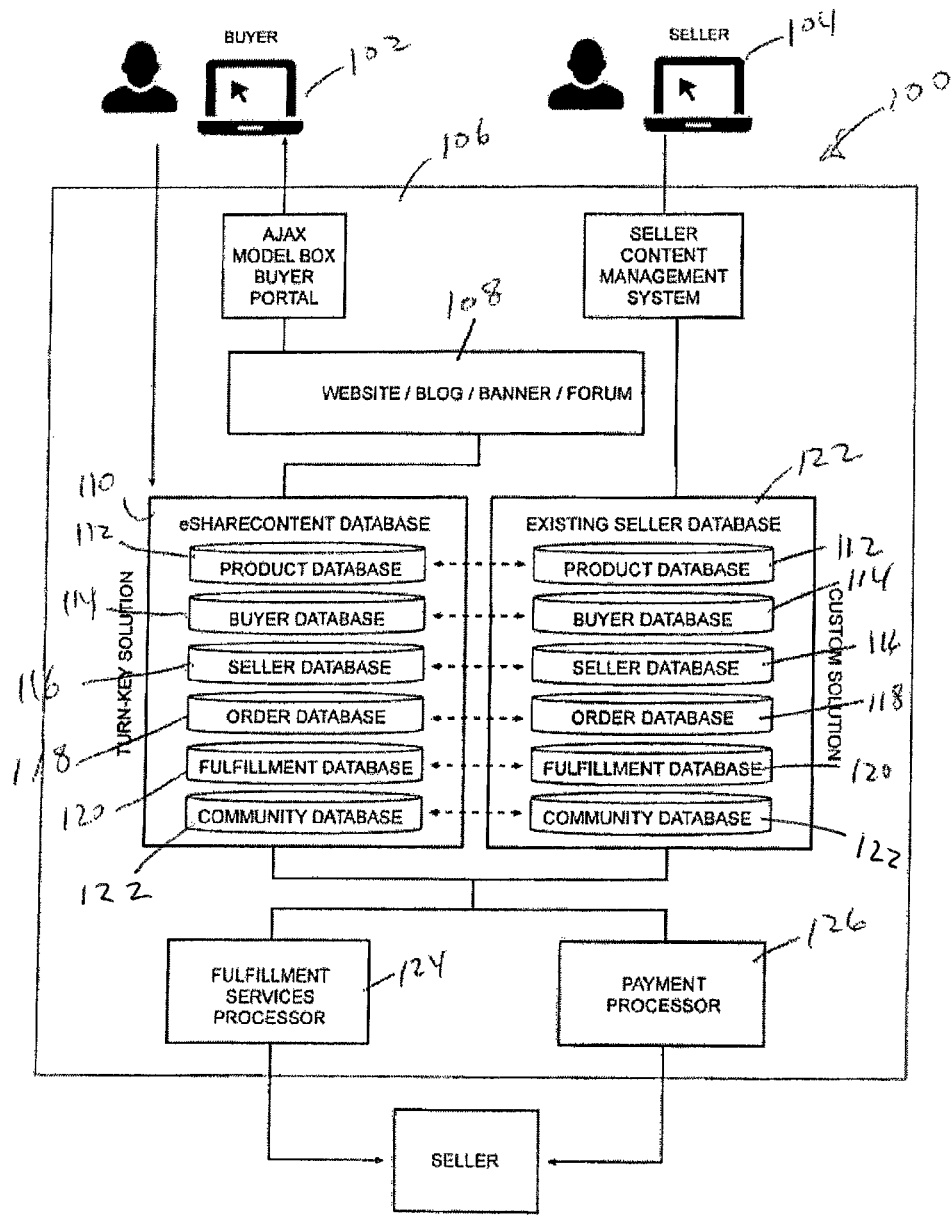
FIG. 19 schematically illustrates a system according to the present invention including the typical elements that a system according to the present invention and a product seller's platform may need to interface with one another to validate payment and to transmit an order to the seller's fulfillment center for shipping the product(s).

FIG. 19 schematically illustrates a system 100 suitable for the implementation of a method according to the present invention. System 100 includes a plurality of computing devices, e.g. PC's, tablets, etc. that are in communication with one another. Specifically, system 100 includes at least one user computing device (UCD) 102, a seller computing device (SCD) 104, and a content management system (CMS) 106. CMS 106 includes at least one or more servers 108 that host a plurality of websites, blogs and the like online information publishing sites each displaying an information object 12. Servers 108 are in operative communication with a CPC 110 which supplies the CEC for the display of window 14, and other graphic user interfaces for conducting an e-commerce transaction and other transactions disclosed above. CPC 110 may include one server or a plurality of servers that host a plurality of databases including a sellers' product database 112, a buyers' information database (registration information etc.) 114, a sellers' information database 116, an order database 18 containing buyer's order information, fulfillment database 120 containing information relating to buyer orders that have been fulfilled and a community database 122 Community database 122 will store the demographic and lifestyle information related to the registered users. The information contained in the community database may enable the system to recognize the registered users and enable the registered users to login and interact with the system from any electronic publishing page. Moreover, the registered sellers will be able to obtain market related information such as conversion rates to sales from different electronic publishing pages based on the information stored in community database 122. As an option, a seller may operate a CPC 122 that includes databases storing information that can be found in the databases of CPC 110. Thus, a seller's CPC 122 may be configured to interact with CPC 110 in order to update its databases and/or update the databases of CPC 110.

It should be noted that all information supplied to and taken from the user's computer passes through CPC 110.

CMS 106 further includes a server or a plurality of servers that function to perform fulfillment services 124. Fulfillment services would include post-sale services such as e-mails or the like notifications regarding shipping of the item, tracking of the item while en route, and other electronic notifications and communications such as communications relating to returns or the like. In addition, CMS 106 would include a server or a plurality of servers that process payments to the seller 126 after e-commerce transactions are concluded.

A registered Seller utilizes CPC 110 to create and generate action buttons, which are then populated into a website, embedded into a banner, or associated with any other electronic publishing page.

Thus, in one embodiment, the E-commerce transaction is processed as a standalone e-commerce system in which seller product information resides solely on the system's CPC 110.

In another embodiment, the seller's existing database(s) can be synchronized with CPC 110 and the payment gateway of a system according to the present invention in order to securely transact and accomplish a purchase through the system.

A payment gateway provides an additional layer of security, which is particularly important since a method according to the present invention involves purchase of products and transaction of payment information outside of an actual e-commerce environment, e.g. through an AJAX window of another website.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system configured to generate computer executable code based on instructions received from another computer, said system being accessible by another computer-based system via a computer accessible communication network, said another computer-based system including at least one computer associated with a first party, at least a second computer associated with a second party, who is not associated with said first party, and at least a third computer associated with a third party, who is not associated with said first party or said second party, the system comprising: a central processing center that is accessible by said computer accessible communication network, said central processing center including at least one computer that is configured to receive instructions from said at least first computer associated with said first party and configured to generate, based on said instructions, computer executable code that enables (a) display of content by a computer display associated with said second party, which is connected to said at least second computer (b) communication between said at least second computer and said central processing center via said computer accessible communication network, and (c) an E-commerce transaction with said at least second computer and said central processing center to purchase a product of the first party, wherein said computer executable code is configured to be transmittable from an electronic publishing page provided by said at least third computer associated with said third party that is unassociated with said first party and unassociated with said second party when said electronic publishing page is accessed by said second party via said at least second computer through said computer accessible communication network, wherein said computer executable code, when executed by said second computer, does not redirect said second computer from said electronic publishing page to another web page, wherein said content includes at least one information section having information related to said product of said first party and an action button, wherein said action button, when selected by said second party, initiates an E-Commerce transaction by generating an order for said product of said first party, wherein said computer executable code enables the display of an information display window by said computer display associated with said at least second computer along with content of said electronic publishing page, wherein said information display window displays said action button and said information related to said product of said first party, wherein said first party is a seller of said product, said second party is a buyer of said product and said third party is an online information publisher, wherein said instructions include a description of said product of said first party, wherein said instructions include a computer displayable object identifying said first party as a source of said product, and wherein said instructions define at least cosmetic aspects of said information display window.

2. A system according to claim 1, wherein said computer accessible communication network includes a plurality of networked computers.

3. A system according to claim 1, wherein said central processing center includes at least a first database for storage of information relating to said product, and is configured to be accessible by said first computer and updateable by said first party via said first computer.

4. A system according to claim 3, wherein said central processing center further includes a section that stores brand information associated with said first party, and is configured to be accessible by said first computer and updateable by said first party via said first computer.

5. A system according to claim 3, wherein said central processing center includes a plurality of templates and is configured to enable said first party to select at least one of said first templates via said first computer, and wherein said executable code is configured to display said content according to a template selected by said first party.

6. A system according to claim 3, wherein said central processing center is configured to enable said first party to select a platform for the display of information relating to said product, and said computer executable code is configured by said central processing center according to a selection made by said first party.

7. A system according to claim 1, wherein said computer executable code enables the display of an information object in association with a static graphic, wherein the activation of the information object results in display of said information display window.

8. A system according to claim 1, wherein said computer executable code enables the display of an information object in association with a text, wherein the activation of the information object results in display of said information display window.

9. A system according to claim 1, wherein said computer executable code enables the display of an information object in association with a video, wherein the activation of the information object results in display of said information display window.

10. A system according to claim 1, wherein said information window includes another action button selection of which initiates transmission of information relating to said product displayed in said information display window.

11. A system according to claim 1, wherein said E-commerce transaction is conducted through said central processing center with a computer enabled system operated by said first party.

* * * * *